United States Patent Office 3,203,854
Patented Aug. 31, 1965

3,203,854
FUNGICIDE AND BACTERICIDE COMPRISING THE REACTION PRODUCT OF 2,4,5-TRICHLOROPHENOL AND BUTYL PHOSPHATE
Marie Adele Josephe Bouillenne-Walrand, Liege, Belgium, and Georges Wetroff, Le Thillay, and Jean Emile Khaladji, Paris, France, assignors to Pechiney, Compagnie de Produits Chimiques et Electrometallurgiques, Paris, France
No Drawing. Filed June 7, 1962, Ser. No. 200,635
6 Claims. (Cl. 167—31)

This invention relates to an agent having bactericidal and fungicidal activity and in the method for preparation and use of same.

This application is a continuation-in-part of our copending application Ser. No. 45,548, filed July 27, 1960, now abandoned and entitled "Fungicide Agent and Process for the Preparation of Said Agent."

In the aforementioned copending application, description is made of the reaction of 2,4,5-trichlorophenol with tri-isobutyl phosphate and/or n-tributyl phosphate to produce a product having a high degree of fungicidal activity without being accompanied with the harmful effects usually experienced with the use of phenolic or halogenated phenolic compounds and derivatives thereof.

It is an object of this invention to produce a product which has a high degree of fungicidal activity and which has a high degree of bactericidal activity and which is substantially free from undesirable effects such as inflamation of the skin or other harmful reactions on the skin or human system, and it is a related object to provide a method for the preparation and for the use of same as fungicide or as a bactericide.

In accordance with the teachings of the aforementioned copending application, which application is incorporated herein by reference, the reaction product of 2,4,5-trichlorophenol with tri-isobutyl phosphate and/or n-tributyl phosphate can be used as a fungicide in the treatment of human mycoses, such as *Trichophyton interdigitale, Candida albicans,* varicose ulcer, eczema, impetigo, edema, and the like, without noticeable or undesirable cutaneous or other disturbance.

It has now been found that the molecular combination of 2,4,5-trichlorophenol with tri-isobutyl phosphate and/or n-tributyl phosphate in approximately equimolecular proportions, in addition to its fungicidal properties, embodies a high degree of bactericidal activity useful in the fight against pathogenic organisms such as:

The actinomycetes, Gram positive or negative bacteria and following bacilli which are given by way of illustration, but not by way of limitation: *Norcardia madurae, Mycobacterium leprae, Bacillus pyocyaneus, Staphylococcus aureus,* Streptococcus and in general acid resisting pathogenic organisms, responsible more particularly for the following diseases or infections: actinomycosis, human leprosy, enteritis, osteitis, whitlow, abcess, furuncle, erisipelas, cystitis, pyelitis, pericolitis, etc.;

The yeasts such as, amongst others, neoformans Cryptococcus which provokes different torulosis especially ulcers and derangements of meninges;

The viruses;

The protozoa such as Trichomonas responsible for some miscarriages.

According to a preferred, though not limiting, embodiment of the invention, the trichlorophenol and phosphate are combined by being brought into intimate contact, at about room temperature or above in weight proportions corresponding to an equimolecular stoichiometric ratio. It is possible, in accordance with the practice of this invention, to make use of an excess of one component over the other but in the case of trichlorophenol, the excess should not exceed a ratio of 1.1 mols of 2,4,5-trichlorophenol per mol of the phosphate. While reaction is preferably carried out at room temperature it will be understood that combinations at higher temperature can be effected.

In accordance with a further embodiment of this invention, the trichlorophenol and phosphate can be combined by means of azeotropic distillation of the combination of both components, as by distillation under vacuum of about 0.01 mm. of mercury and at a temperature within the range of 94–103° C. A product is obtained which gives an approximate analysis of 40 percent by weight trichlorophenol and 60 percent by weight of tri-isobutyl phosphate.

The reaction product can be used as a germicide or as a bactericide without dilution or without admixture with other carriers. Instead, it can be applied in dilutions with other suitable carriers in either liquid, powder or paste form and preferably in a carrier which is inert, non-toxic and free of effect on the fungicidal or bactericidal agent. The following will represent carrier systems which may be employed in the application of the active ingredient, namely, the reaction product of 2,4,5-trichlorophenol and the tri-isobutyl and/or n-tributyl phosphate:

Either in solution in conventional excipients or solvents such as an alcohol as represented by isopropyl alcohol, ethyl alcohol and the like; an aldehyde such as benzaldehyde, propylaldehyde and the like; an ester such as ethyl acetate, amyl acetate and the like; a ketone such as acetone; a halogenated hydrocarbon such as the Freons represented by dichlorodifluoromethane, trichloromonofluoromethane and the like, or mixtures thereof;

Or in aqueous emulsions or suspensions;

Or as a paste formed of conventional ingredients;

Or in finely divided state, as represented by a powder in which the inert non-toxic carrier may be selected of kaolin, talc and the like.

By way of modification, a tensio-active agent, such as lauric or myristic alcohol sulphate, can be incorporated as an ingredient in the foregoing compositions in order to achieve better spreading or distribution of the active ingredient.

When embodied in a suitable, non-toxic carrier, it is desirable to formulate the treating composition to contain an amount of the active ingredient ranging up to 10 percent by weight and preferably between about 0.01 to about 0.25 percent by weight. The active ingredient alone or in combination with a suitable carrier can be applied topically onto the skin, in the form of drops, cream, powder or the like. It can also be administered such as by intramuscular injection, buccal duct, parenteral duct, such for example as suppository, ovule, rod, or the like. Owing to its batecteriostatic power, the active agent alone or in combination with a suitable carrier can also be used as a disinfectant or as an antiseptic.

The following examples are given by way of illustration, but not by way of limitation, of the process for the preparation and use of the active ingredient as a fungicide in Example 1 and as a bactericide in Examples 2, 3, 4 and 5:

*Example 1*

40–50 parts by weight of 2,4,5-trichlorophenol and 50–60 parts by weight of tri-isobutyl phosphate are combined at room temperature by thorough kneading. The product when diluted in the order of about 150,000 to 200,000 volumes with a non-toxic solvent, such as a hydroalcoholic solvent, will inhibit any growth and/or kill any culture of *Trichophyton interdigitale* in the so-called Sabouraud medium consisting of 60 grams glucose, 10 grams mycological peptone, 20 grams agar-agar, and 1000 cubic cm. of distilled water.

Example 2

Equimolecular quantities of 2,4,5-trichlorophenol and tri-isobutyl phosphate are intimately mixed. 0.25 g. of the product thus obtained is taken and is incorporated with the excipient having the following composition:

| | G. |
|---|---|
| Bentonite | 13.00 |
| Water | 25.99 |
| Cherry-laurel water | 25.99 |
| Polyethylene glycol 1500[1] | 21.66 |
| Cetylic alcohol | 1.74 |
| Stearic alcohol | 1.74 |
| Boric acid | 2.60 |
| Burow solution[2] | 2.60 |
| Aquarex D[3] | 0.10 |
| Isopropyl alcohol | 4.33 |

[1] Polyethylene glycol 1500: Polyethylene glycol monostearate of molecular weight 500–600.
[2] Burow solution weight percent composition: Tartaric acid 3,499+acetic acid 5,800+calcium carbonate 7,089 +aluminum sulphate 16,11+distilled water 67,502.
[3] Aquarex D: Trademark for sodium salts of sulphate monoesters of a mixture of higher fatty alcohols consisting chiefly of the lauryl and myristyl derivatives—sp. gr. 1.33.

The cream obtained is applied on the wounds and lesions provoked by Streptococcus and Staphlococcus which are rapidly destroyed.

Example 3

A solution is prepared containing 0.1 percent by weight of 2,4,5-trichlorophenol-tri-isobutyl phosphate in aqueous isopropyl alcohol (30% by weight of alcohol). This solution has been used in the treatment of a patient suffering from intertrigo lesions of the toe. These lesions had spread to his legs and were presenting the following aspect: bleeding and purulent quick wounds, vesiculate in non-denuded places with bubbling reaction on the two plantar faces and secondary reactions on the palmar face of both of his hands. The application of the solution of Example 3 at the rate of 1 to 2 drops per day for one week brought about sedation and retraction of the lesions. The patient is definitely cured within a period of time less than one fortnight by continued application of the composition.

Example 4

A solution is prepared containing 0.1 percent by weight of the active ingredient of Examples 1, 2 and 3 in aqueous 96% isopropyl alcohol. 1 to 2 drops of the solution is applied into the gape of the articulation of a diabetic suffering from a gangrened wound which originally was in the following condition: In the external submalleolar region, a diabetic gangrene disc having the size of a 5-cent piece has formed. On the anterior face of the second toe, a gangrened wound has infected the phalangeal articulation and the articulation of the second and third toe joint is gaping and there are signs of sliding.

Soon after application of the treating composition all spreading of the lesions is stopped. The bactericide operates to sterilize the wound and spontaneous closing of the wound is noted.

Example 5

A patient suffering from a gaping and suppurating wound of one of his toe articulation has been treated with the solution of Example 4. The toe was swollen, red and hot. The daily application of 1 to 2 drops of the said solution brought about rapid decrease of suppuration and inflammation. Suppuration is dried up before the wound heals. After six weeks of treatment, a foreign body (a scoria which is not registered by X-ray photography) is spontaneously eliminated. Thereafter, the closing of the wound comes about within a few days.

Corresponding results, either as a fungicide or a bactericide, are not obtainable from a product of the reaction of tri-isobutyl phosphate with other phenolic or chlorinated phenolic compounds and it is significant that corresponding fungicidal activity or bactericidal activity is not available from the product of the reaction of the described phosphates with other trichlorophenols such as 2,3,5-trichlorophenol or 2,4,6-trichlorophenol, thus indicating that an entirely different system results from the combination of 2,4,5-trichlorophenol with tri-isobutyl phosphate or n-tributyl phosphate.

It will be understood that changes may be made in the details of formulation and method of application without departing from the spirit of the invention, especially as defined in the following claims.

We claim:

1. A composition adapted for use as a fungicide and as a bactericide comprising a non-toxic carrier and a reaction product formed from the reaction of 2,4,5-trichlorophenol with a phosphate selected from the group consisting of tri-isobutyl phosphate and n-tributyl phosphate, said reaction product being present in an amount within the range of 0.01 to 10 percent by weight in the non-toxic carrier.

2. A composition adapted for use as a fungicide and as a bactericide comprising a non-toxic carrier and a reaction product formed from the reaction of 2,4,5-trichlorophenol with a phosphate selected from the group consisting of tri-isobutyl phosphate and n-tributyl phosphate, said reaction product being present in an amount within the range of 0.01 to 0.25 percent by weight in the non-toxic carrier.

3. A composition as claimed in claim 1 in which the non-toxic carrier comprises a liquid in which the reaction product is soluble.

4. A composition as claimed in claim 1 in which the non-toxic carrier comprises a liquid in which the reaction product is dispersed.

5. A composition as claimed in claim 1 in which the non-toxic carrier comprises a semi-solid in which the reaction product is embodied as a salve.

6. A composition as claimed in claim 1 in which the non-toxic carrier comprises a solid substance in the form of a finely divided powder with which the reaction product is admixed.

References Cited by the Examiner

UNITED STATES PATENTS

| | | | |
|---|---|---|---|
| 1,879,351 | 9/32 | Lehmann | 167—31 |
| 2,599,515 | 6/52 | Moyle | 260—461 |
| 2,678,329 | 5/54 | Gamrath et al. | 260—461 |
| 2,854,375 | 9/58 | Shackell | 167—31 |
| 2,937,971 | 5/60 | Shackell | 167—31 |

OTHER REFERENCES

Long: Handbook of Chemistry, 6th edition (1964), page 648, Entry No. 6121.

JULIAN S. LEVITT, *Primary Examiner.*

MORRIS O. WOLK, LEWIS GOTTS, *Examiners.*